United States Patent

Cloeren et al.

[11] Patent Number: 5,208,047
[45] Date of Patent: May 4, 1993

[54] APPARATUS FOR ADJUSTING DIE LIP GAP

[75] Inventors: Peter F. Cloeren; Richard L. Linam, both of Orange, Tex.

[73] Assignee: The Cloeren Company, Orange, Tex.

[21] Appl. No.: 857,718

[22] Filed: Mar. 26, 1992

Related U.S. Application Data

[63] Continuation of Ser. No. 637,178, Jan. 3, 1991, abandoned, which is a continuation-in-part of Ser. No. 521,101, May 9, 1990, Pat. No. 5,020,984.

[51] Int. Cl.$^5$ .............................................. B29C 47/22
[52] U.S. Cl. .................................. 425/141; 264/40.1; 425/143; 425/466
[58] Field of Search ............... 425/140, 141, 143, 144, 425/461, 466; 264/40.1, 40.3, 40.5, 40.6, 40.7

[56] References Cited

U.S. PATENT DOCUMENTS

| | | | |
|---|---|---|---|
| 2,938,231 | 5/1960 | Lowey | 425/466 |
| 3,261,893 | 7/1966 | George et al. | 264/40.2 |
| 3,920,365 | 11/1975 | Mules | 425/141 |
| 3,940,221 | 2/1976 | Nissel | 425/466 |
| 4,507,073 | 3/1985 | Shelton | 425/466 |
| 4,726,752 | 2/1988 | Van Dun | 425/141 |
| 4,753,587 | 6/1988 | Djordjevic et al. | 425/466 |
| 4,781,562 | 11/1988 | Sano et al. | 425/466 |
| 4,854,844 | 8/1989 | Carlsen | 425/141 |
| 5,051,082 | 9/1991 | Hattori et al. | 425/141 |

FOREIGN PATENT DOCUMENTS

| | | | |
|---|---|---|---|
| 383418 | 8/1990 | European Pat. Off. | |
| 3731961 | 4/1989 | Fed. Rep. of Germany | 425/466 |

*Primary Examiner*—David A. Simmons
*Assistant Examiner*—William J. Matney, Jr.
*Attorney, Agent, or Firm*—Timothy R. Kroboth

[57] ABSTRACT

The present invention provides an extrusion apparatus having an improved mechanism for thermally-controlled, lip gap adjustment. The apparatus includes a flow path for a gaseous cooling medium, in which flow path a plurality of temperature-responsive, lip gap adjustment members are disposed. In contact with each such adjustment member is a heating element.

11 Claims, 5 Drawing Sheets

APPARATUS FOR ADJUSTING DIE LIP GAP

Reference to Related Applications

This application is a continuation of application Ser. No. 637,178, filed Jan. 3, 1991, now abandoned which is a continuation-in-part of U.S. patent application Ser. No. 521,101, filed on May 9, 1990, now U.S. Pat. No. 5,020,984 issued Jun. 4, 1991.

BACKGROUND OF THE INVENTION

This invention relates to an extrusion apparatus having a lip gap adjustment mechanism for controlling sheet thickness.

As illustrated by U.S. Pat. Nos. 2,938,231, 3,940,221 and 4,753,587, an extrusion apparatus having a plurality of temperature-responsive, lip gap adjustment assemblies spaced apart across the width of the apparatus, is known. The lip gap is widened or narrowed as the gap-controlling, bolts or rods expand or contract thermally.

The '231 apparatus utilizes individually controllable, resistance heating wires coiled around and in direct contact with the gap-controlling, adjustment bolts. The '587 apparatus uses individually controllable, cartridge heaters, each of which is situated within a bore having a continuous helical channel for flow of a cooling medium. A cover for the lip adjustment assemblies thereof functions as a guide plate for the outflow of the cooling medium. An insulating member is used.

There is a need for an extrusion apparatus having an improved mechanism for controllably adjusting the lip gap. Advantageously, such an improved apparatus would provide for rapid thermally-controlled, lip gap adjustment.

SUMMARY OF THE INVENTION

It is accordingly an object of the present invention to provide an improved extrusion apparatus having a mechanism for controllably adjusting the lip gap.

It is a further object of the present invention to provide an improved apparatus that provides for rapid thermally-controlled, lip gap adjustment.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an extrusion apparatus including lips forming an exit opening which extends along the width of the apparatus, and an exit opening control assembly. The control assembly includes spaced-apart members each having capacity to expand and contract thermally. Each temperature-responsive member is operatively arranged to adjust the exit opening at an individual location by expansion and contraction. A heating element is associated with, and in contact with, each such member.

Beneficially, the temperature-responsive members are disposed within a common chamber. The common chamber is in fluid communication with a plenum, and forms in combination with the plenum a flow path for a gaseous medium for positively cooling the temperature-responsive members. The plenum has an inlet for the gaseous medium and the common chamber provides an outlet. An insulating member is interposed between a main body of the apparatus, and the flow path and the temperature-responsive members disposed within the common chamber of the flow path.

In the drawing and detailed description of the invention that follow, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

The present invention is directed to a novel extrusion apparatus having a simplified mechanism for controllably adjusting the lip gap. Advantageously, this apparatus is able to provide for rapid thermally-controlled, lip gap adjustment.

Figure 1:
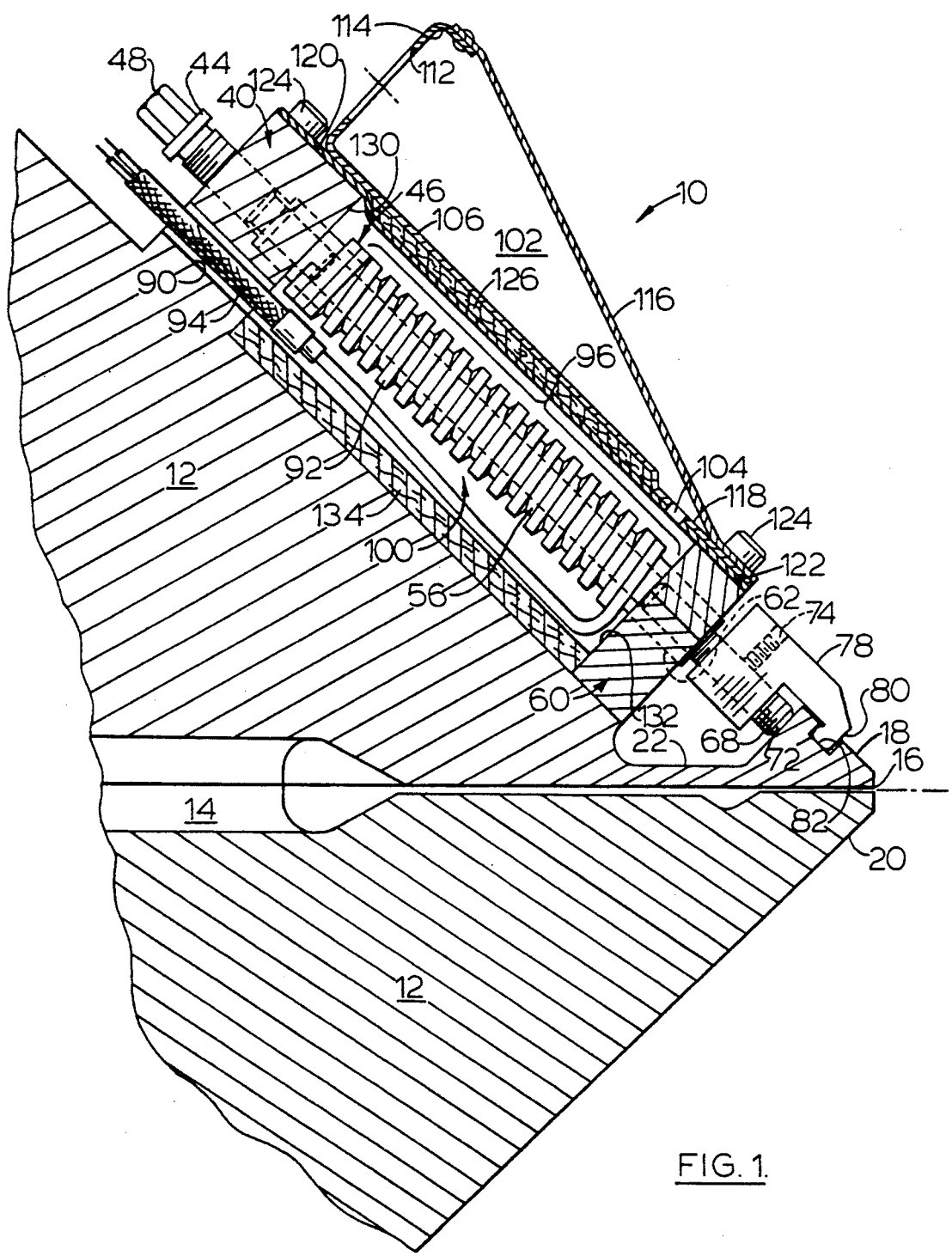
FIG. 1 is a partial cross-sectional view of a preferred embodiment of an extrusion apparatus in accordance with the present invention.

Referring to FIG. 1, a preferred embodiment of an extrusion apparatus 10 in accordance with the present invention, is shown. The apparatus includes a main body 12 having a flow passageway 14, which terminates in an exit slot 16 formed by lips 18,20. Lip 18 has a necked down portion defined by a recess 22, which allows flexibility of the lip for adjustably varying the thickness of the exit slot, thereby controlling the thickness of the extruded sheet. Exit slot 16 extends along the entire width, shown in FIG. 2, of the apparatus.

Figure 3:
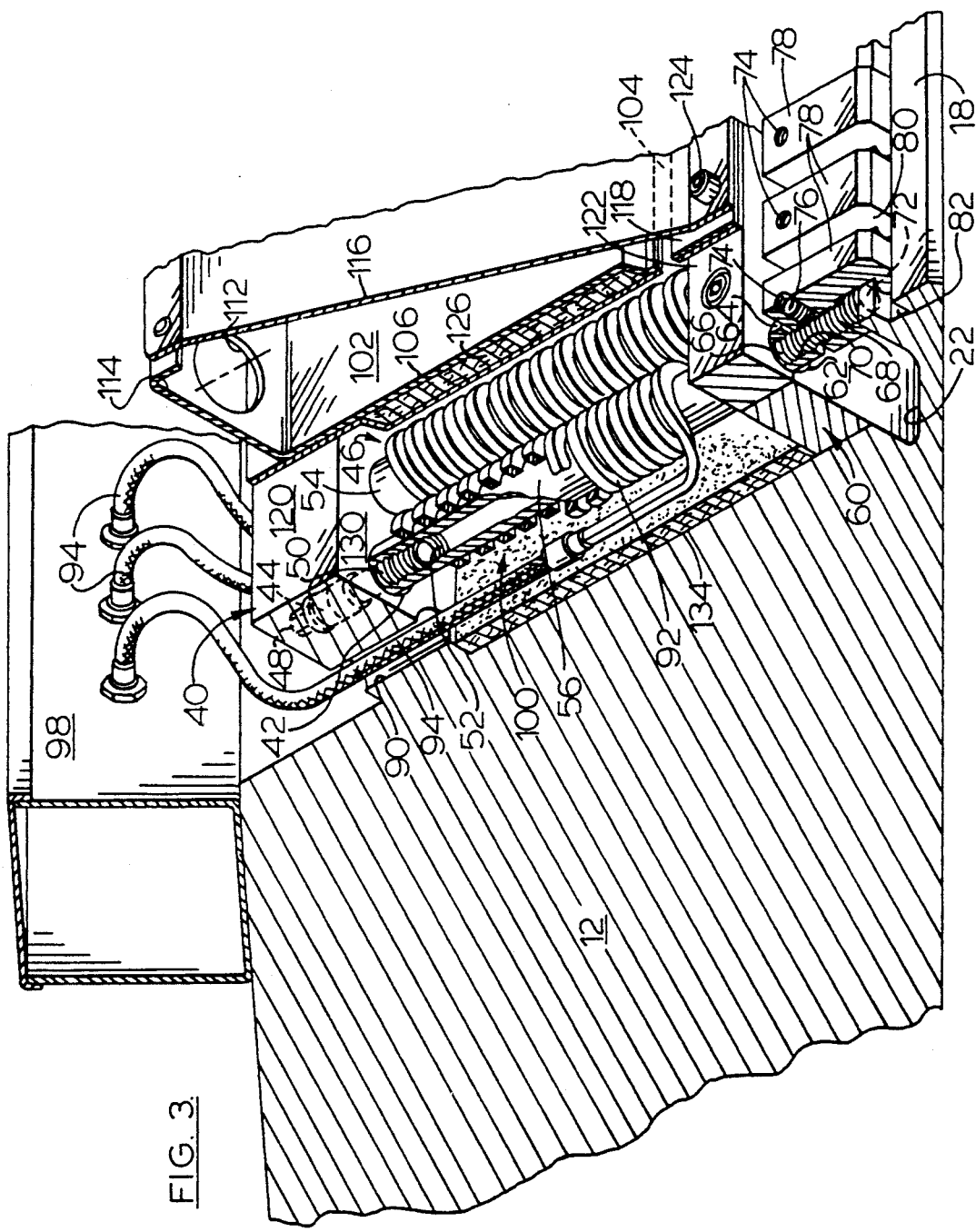
FIG. 3 is a cross-sectional view taken substantially along line 3—3 of FIG. 2, showing further details of the apparatus of FIG. 1.

Referring to FIG. 3, main body 12 has an extension 40 along its width which has a bore 42, through which an adjustment bolt 44 of a pushrod/adjustment assembly 46 is threaded and extends. A head 48 of the bolt is engageable by a wrench for manual adjustment of the lip gap.

Beneficially, bolt 44 has two different thread pitches to form what is commonly referred to as a differential thread adjustment bolt. Lower threads 50 of the bolt engage interior threads 52 of an upper end 54 of a pushrod 56 of adjustment assembly 46. The finer pitch of the lower bolt threads working in harmony with the coarser pitch of the upper bolt threads provides for fine manual adjustment of the exit slot 16.

Pushrod 56 is advantageously a hollow tube. This feature facilitates fast response of the pushrod to temperature change. To additionally provide for a fast rate of thermal response, the pushrod is advantageously made of stainless steel.

Main body 12 also has an extension 60 along its width which has a smooth throughbore 62, through which a lower end 64 of the temperature-responsive pushrod extends. Threads 66 of a bolt 68 of adjustment assembly 46 engage interior threads 70 of the lower end of the pushrod. Bolt 68 has an operating end 72 in contact with lip 18.

Mounted on bolt 68 and having a bore 74 for a threaded fastener 76 for contact with the bolt, is a push-pull adjustment block 78 of pushrod/adjustment assembly 46. Adjustment block 78 has a projection 80 which engages a groove 82 of lip 18.

Extension 40 of main body 12 also includes a bore 90 which beneficially has a diameter sufficient to allow exit flow, when a resistance heating wire 92 is in place, of a gaseous medium used as a cooling medium. Power leads 94 for heating wire 92 extend through bore 90.

Coiled around, and advantageously in direct contact with, a portion 96 of pushrod 56 disposed between extensions 40,60 of the main body is heating wire 92, which may be individually controllable. Direct contact of wire 92 with pushrod 56 facilitates quick heat transfer between the wire and the pushrod. Direct contact is beneficial both in the heating of the pushrod and in drawing heat from the pushrod for cooling.

It will be appreciated that FIG. 1 shows only one pushrod/adjustment assembly, and that many such assemblies are arranged in a predetermined spaced-apart relationship across the width of an extrusion apparatus in accordance with the present invention. A plurality of such assemblies are indicated in the view of FIG. 2, in which the width of apparatus 10 is designated by a "W", and in which an electric box 98 from which lead wires 94 emanate, is shown.

Figure 2:
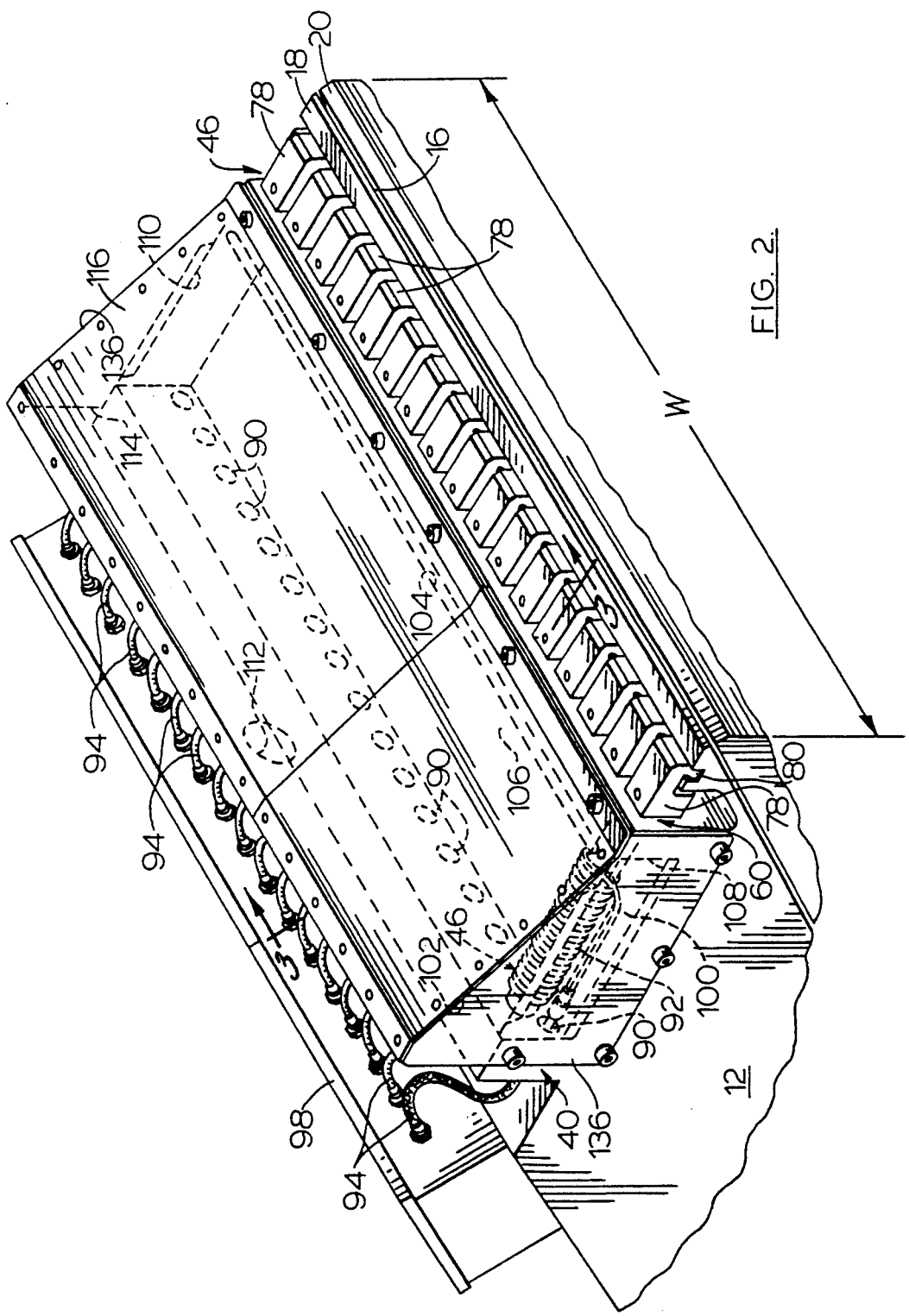
FIG. 2 is a partial perspective view of the extrusion apparatus of FIG. 1.

Referring to FIGS. 1 and 3, the pushrods and surrounding wires of the assemblies indicated in FIG. 2, are advantageously disposed within a common chamber 100, which is in fluid communication with a second chamber or plenum 102. The combination of chamber 100 and plenum 102 provides a flow path for the gaseous medium.

With reference to FIG. 2, beneficially providing for fluid communication between the chamber and plenum is an elongated slot 104, which may be intermittent to provide structural strength. Slot 104 is located in a wall member 106 which is common to chamber 100 and plenum 102. Suitably, the slot has a width which extends from the locus of a pushrod/adjustment assembly at an end 108 of chamber 100 to the locus of a pushrod/adjustment assembly at an opposite end 110 of the chamber. Wall member 106 has a width that is substantially the same as the width W of apparatus 10.

Referring particularly to FIG. 3, an inlet 112 provides for the inflow of the gaseous medium, which may be air, into plenum 102, and then into chamber 100 and contact with the pushrods and surrounding wires. Beneficially, the gaseous medium provides for positive cooling by directly contacting the pushrods and surrounding wires. Inlet 112 is in fluid communication with a source, not shown, of the cooling gas, which will conveniently be forced air.

Cooling gas forced into plenum 102, will be at a pressure greater than atmospheric pressure, with the pressure generally ranging from about 16 to 30 psia. A typical pressure will be about 16 to 20 psia, for which a blower may be used as a source of forced air. If a higher pressure is desired, compressed air may be used. A flow rate of about 1 cfm per bolt, for the cooling gas will be typical, but it will be understood that a suitable flow rate will vary depending upon conditions for instance, of ambient temperature and operating temperature of the extrusion apparatus. A flow rate of about 0.75 to about 0.85 cfm per bolt has been found beneficial.

Conveniently, particularly in the case of air, the cooling gas may be at ambient temperature, but if desired, could be cooled by conventional means prior to passage into plenum 102. It will be appreciated that increased cooling within chamber 100 may be provided by either increasing gas flow or, for instance, by cooling the gas prior to passage into the plenum.

Fluid flow through plenum 102 and into chamber 100 is aerodynamically directed as now explained. Inlet 112 is located at an opposite end 114 of the plenum from elongated slot 104. Additionally, wall member 106 and a wall member 116, which cooperate to form the plenum, converge at an elongated slot end 118 of the plenum. As a result, the gaseous medium is directed into chamber 100.

As shown in FIG. 2, outflow of cooling gas is provided by a plurality of bores 90. A power lead 94, which connects to a heating wire 92, conveniently extends through each of these bores. Each such bore has a diameter sufficient to allow exit flow of the gaseous medium. Each pushrod 56 beneficially has a outflow bore 90 proximate thereto. FIG. 2 indicates an outflow bore for each pushrod.

Referring also to FIG. 1, plenum 102 is detachably fastened to the main body 12 of the apparatus in order to provide for easy access to chamber 100. Fastening of the plenum to walls 120 and 122 of main body extensions 40,60, respectively, may be provided by, for instance, threaded fasteners 124. If desired, access to chamber 100 could be provided by a hinged plenum.

With reference to FIGS. 1 and 3, wall member 106, which is conveniently common to both chamber 100 and plenum 102, advantageously includes insulating material 126. Insulation 126 reduces a warming effect of heat within chamber 100, on the gaseous medium flowing through the plenum. Generally, any such warming effect would be insignificant due to a short residence time of the gaseous medium in the plenum.

Wall surfaces 130,132 of main body extensions 40,60, respectively, cooperate with wall member 106 and beneficially with an insulating member 134 to form chamber 100. Insulating member 134 is therefore interposed between main body 12 of the apparatus and the gaseous medium flow path, in particular chamber 100 thereof, in which the pushrods and surrounding wires are disposed. End cover plates 136, shown in FIG. 2, seal the ends of chamber 100 and plenum 102.

As can be understood, an apparatus in accordance with the present invention, includes a plurality of temperature-responsive pushrod/adjustment assemblies for controllably adjusting the lip gap, and these assemblies are spaced apart along the width of the apparatus. Furthermore, each pushrod is beneficially hollow, and surrounded by, and advantageously in direct contact with, an individually controllable, heating wire; a gaseous medium is aerodynamically directed into a common chamber containing the pushrods; and a gaseous medium outlet proximate to each pushrod is advantageously provided. In this way, the inventive apparatus provides for fine thermally-controlled adjustment of the lip gap along the entire width of the exit opening. Furthermore, the apparatus provides for fast response of the pushrods to temperature change, and consequently for reduced time to obtain a desired lip gap adjustment.

In operation, manual adjustment of the lip gap of apparatus 10 is provided by rotation of the head 48 of each differential thread adjustment bolt 44 in the desired direction. Thereafter, flow of the thermoplastic stream through lips 18,20 is commenced.

Once a steady state operation has been reached, the extruded sheet is measured along the width, and deviations from the desired thickness are used to determine the heat output of individual wires 92. A stream of ambient or cooled air is continuously passed through the flow path provided by plenum 102 and chamber 100. Pushrods 56, which are located in chamber 100, expand and contract longitudinally in response to the thermal environment. Thermally-controlled, lip gap adjustment is typically provided by changing only the heat output. However, the flow rate or temperature of the cooling gas may be additionally changed.

Figure 4:
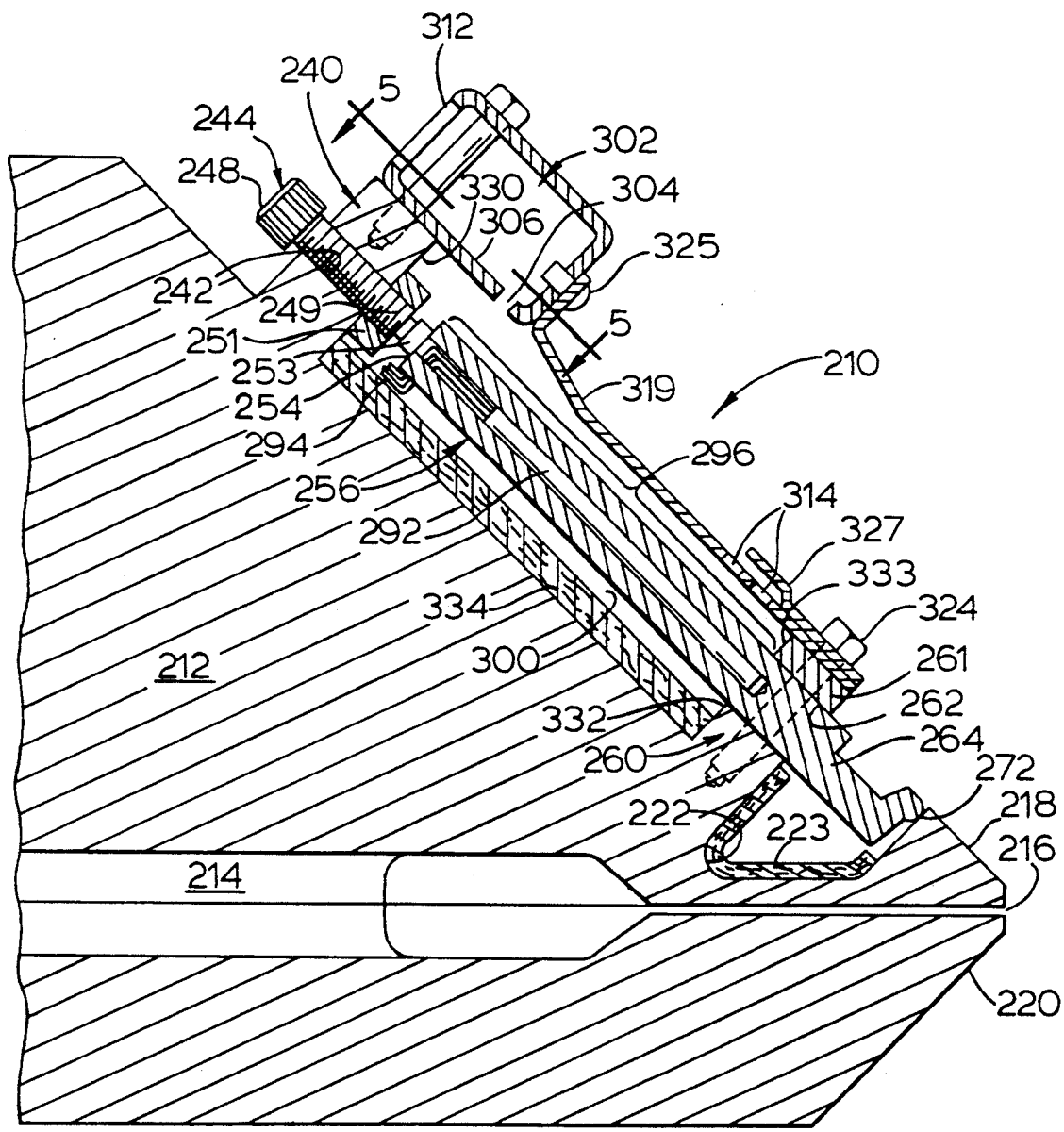
FIG. 4 is a partial cross-sectional view, similar to that of FIG. 1, of a highly preferred embodiment of an extrusion apparatus in accordance with the present invention.

Referring to the partial cross-sectional view of FIG. 4, which shows a single pushrod in cross-section, a highly preferred embodiment of an apparatus in accordance with the present invention, likewise includes a plurality of temperature-responsive pushrods for controllably adjusting the lip gap, with the pushrods being spaced apart along the width of the apparatus, and includes a cartridge heater. The view of FIG. 4 is near the centerline of the apparatus. Like parts of the embodiment of this Figure have been designated with numbers corresponding to like parts of the embodiment of FIG. 1. For sake of brevity, details previously described are not repeated.

With further reference to FIG. 4, a main body 212 of a preferred extrusion apparatus 210 has a flow passageway 214, which terminates in an exit slot 216 formed by lips 218,220. Lip 218 has a necked down portion defined by a recess 222. An insulating member 223 is advantageously disposed in recess 222.

Main body 212 has an extension 240 along its width which has a bore 242, through which an adjustment bolt 244 extends. A head 248 of the bolt is engageable by a wrench. An end 249 of the bolt is in threaded engagement with a nut 251, and a toggle shoe 253 is pivotably connected to bolt end 249. Toggle shoe 253 engages an upper end 254 of a pushrod 256.

Main body 212 also has an extension 260 along its width which combines with a member 261 to form a passageway 262, through which a lower end 264 of the pushrod extends. Pushrod 256 has an operating end 272 in contact with lip 218.

Beneficially, a cartridge heating element 292, which may be individually controllable, is disposed within pushrod 256. Relatively less thermal mass for a heating element and pushrod is advantageous. Power leads 294 for cartridge heating element 292 emanate from an electric box (not shown). Heating element 292 is within a portion 296 of the pushrod generally disposed between extensions 240,260.

As in the case of the FIG. 1 embodiment, the pushrods are beneficially disposed within a common chamber 300. The common chamber is in fluid communication with a second chamber or plenum 302, which has a width that is conveniently the same as the width of the common chamber. The combination of chamber 300 and plenum 302 provides a flow path for the gaseous medium.

Figure 5:
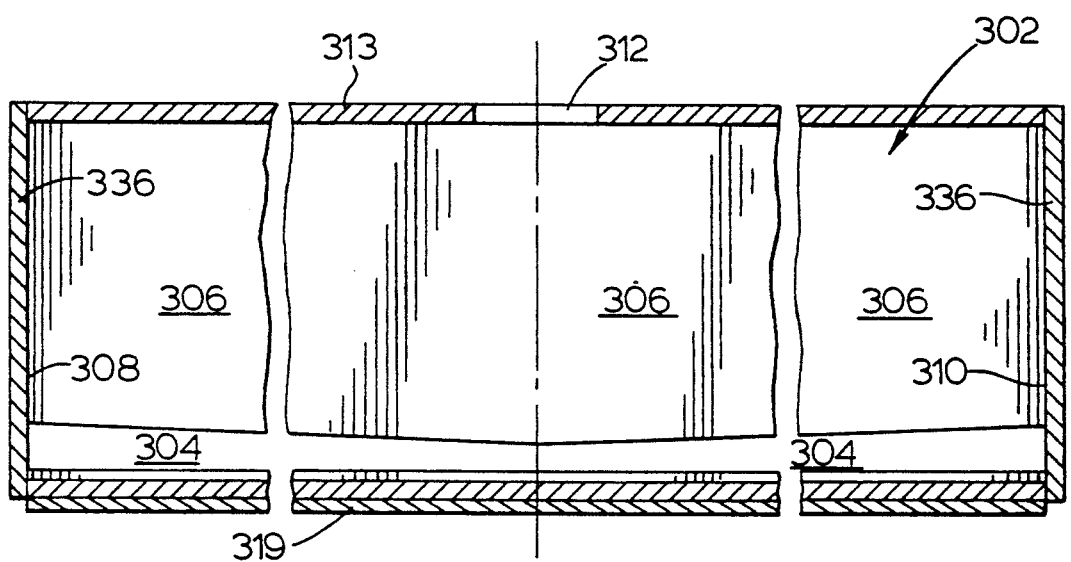
FIG. 5 is a partial cross-sectional view, simplified for clarity, taken substantially along line 5—5 of FIG. 4.

Beneficially providing for fluid communication between the common chamber and the plenum is an elongated slot 304, shown more clearly in FIG. 5. The slot, which may be intermittent, is located in a wall member 306, which is common to chamber 300 and plenum 302. Suitably, the slot generally extends from an end 308 of the plenum to another end 310.

To provide substantially uniform flow of the gaseous medium to each pushrod in the common chamber, a slot providing for fluid communication between the plenum and common chamber of the invention, may be tapered. It will be particularly advantageous to use a tapered slot as the width of the extrusion apparatus becomes greater.

The shape and the degree of the taper of such a slot will depend upon variables including the location of an inlet for inflow of the gaseous medium into the plenum and the pressure of the gaseous medium in the plenum. When as shown in FIG. 5, the location of an inflow inlet 312 in a plenum wall 313 is about midway across the apparatus width, the slot will typically be wedge-shaped about the centerline (depicted in broken line in FIG. 5) of the apparatus; whereas, if an inflow inlet were situated at each of ends 308,310 of the plenum, the slot would generally be tapered such that the slot increases in gap from each end of the plenum to the centerline of the apparatus. For a relatively greater pressure of the gaseous medium in the plenum, the slot may be relatively narrower and the degree of taper may be relatively less; whereas for a relatively lower pressure of the gaseous medium in the plenum, the slot may be relatively wider and the degree of taper may be relatively greater.

In any event, the gaseous medium passes from plenum 302 through slot 304 into the common chamber and contact with the pushrods. Beneficially, the gaseous medium directly contacts the pushrods.

Ports 314 for outflow of cooling gas from chamber 300, are provided in a wall plate 319. Fluid flow through the common chamber may be aerodynamically directed by locating the outflow ports at an opposite end of the chamber from inlet slot 304. The outflow ports may be in the form of elongated slots. A single elongated slot could be used. If desired, wall plate 319 could be in the form of a grill-like structure having numerous openings.

Wall plate 319 is advantageously detachably fastened to the apparatus by fasteners 324,325 to provide for easy access to the common chamber. If desired, plate 319 could be hinged near fastener 324. Fastener 324 also provides for attachment of a deflector member 327, which beneficially directs gaseous medium outflow away from lips 218,220 of main body 212 of the apparatus, and provides for attachment of member 261 to the main body.

Wall surfaces 330,332,333 of main body extensions 240,260, and member 261, respectively, cooperate with wall plate 319, wall member 306, and beneficially with an insulating member 334 to form the common chamber. The insulating member is interposed between main body 212 of the apparatus and the gaseous medium flow path, in which the pushrods are disposed. End cover plates 336, shown in FIG. 5, seal the ends of plenum 302. Another pair of plates (not shown) seal the ends of the common chamber.

Having described the invention in detail and by reference to preferred embodiments thereof, it will be apparent that modifications and variations are possible without departing from the scope of the invention defined in the appended claims. Several changes or modifications have been briefly mentioned for purposes of illustration.

We claim:

1. An extrusion apparatus comprising means forming an exit opening which extends along the width of the apparatus, and exit opening control means comprising a plurality of spaced-apart adjustment members each having capacity to expand and contract thermally, and each operatively arranged to adjust the exit opening at an individual location by expansion and contraction, individual heating means associated with, and in contact with, each of said plurality of adjustment members, said heating means and said plurality of adjustment members being disposed within a common chamber, said common chamber being in direct fluid communication with an upstream chamber via an elongated slot that extends along said width of said apparatus, said upstream chamber having means for inletting a gaseous medium, said upstream chamber being formed by walls that converge in the direction of said elongated slot, said common chamber having means for outflow of said gaseous medium, and insulating means disposed between a main body of said apparatus and said plurality of adjustment members.

2. The apparatus of claim 1, wherein said elongated slot is continuous.

3. An extrusion apparatus comprising means forming an exit opening which extends along the width of the apparatus, and exit opening control means comprising a plurality of spaced-apart adjustment members each having capacity to expand and contract thermally, and each operatively arranged to adjust the exit opening at an individual location by expansion and contraction, individual heating means associated with, and in contact with, each of said plurality of adjustment members, said heating means and said plurality of adjustment members being disposed within a common chamber, said common chamber being in direct fluid communication with an upstream chamber via an elongated slot, said upstream chamber having means for inletting a gaseous medium, said elongated slot extending along said width of said apparatus and being of increasing opening away form said means for inletting said gaseous medium, said common chamber having means for outflow of said gaseous medium, and insulating means disposed between a main body of said apparatus and said plurality of adjustment members.

4. The apparatus of claim 3, wherein said elongated slot is continuous.

5. The apparatus of claim 3, wherein said elongated slot is wedge-shaped about a centerline of said extrusion apparatus.

6. The apparatus of claim 5, wherein said wedge-shaped slot is of increasing gap from said centerline to each end of said second chamber.

7. An extrusion apparatus comprising means forming an exit opening which extends along the width of the apparatus, and exit opening control means comprising a plurality of spaced-apart adjustment members each having capacity to expand and contract thermally, and each operatively arranged to adjust the exit opening at an individual location by expansion and contraction, individual heating means associated with, and in contact with, each of said plurality of adjustment members, said heating means and said plurality of members being disposed within a common chamber, said common chamber being in direct fluid communication with an upstream chamber via an elongated slot extending along said width of said apparatus, said upstream chamber having means for inletting a gaseous medium, said common chamber having means for outflow of said gaseous medium disposed between said elongated slot and said exit opening, and insulating means disposed between a main body of said apparatus and said plurality of adjustment members.

8. The apparatus of claim 7, further comprising means for directing the gaseous medium outflow away from said exit opening.

9. The apparatus of claim 7, wherein said elongated slot is continuous.

10. The apparatus of claim 7, wherein said elongated slot is of increasing opening away form said means for inletting said gaseous medium.

11. An extrusion apparatus comprising means forming an exit opening which extends along the width of the apparatus, and exit opening control means comprising a plurality of spaced-apart adjustment members each having capacity to expand and contract thermally, and each operatively arranged to adjust the exit opening at an individual location by expansion and contraction, individual heating means associated with, and in contact with, each of said plurality of adjustment members, said heating means and said plurality of members being disposed within a common chamber, said common chamber being in direct fluid communication with an upstream chamber via a continuous elongated slot, said upstream chamber having means for inletting a gaseous medium, said elongated slot extending along said width of said apparatus and being of increasing opening away from said means for inletting said gaseous medium, said common chamber having means for outflow of said gaseous medium disposed between said elongated slot and said exit opening, and insulating means disposed between a main body of said apparatus and said plurality of adjustment members.

* * * * *